United States Patent [19]

Allen et al.

[11] Patent Number: 4,894,943

[45] Date of Patent: Jan. 23, 1990

[54] METHOD AND APPARATUS FOR GATHERING FISH FROM THE BUNT OF A NET

[75] Inventors: Robert F. Allen, Rancho Santa Fe; Douglas H. Dirks, La Mesa, both of Calif.

[73] Assignee: Marco Seattle, Inc., Seattle, Wash.

[21] Appl. No.: 293,811

[22] Filed: Jan. 5, 1989

[51] Int. Cl.[4] ............................................. A01K 79/00
[52] U.S. Cl. ......................................... 43/6.5; 43/11; 43/8
[58] Field of Search .................. 43/7, 8, 11, 100, 102, 43/101, 103, 104, 105, 6.5, 14, 9, 10, 11

[56] References Cited

U.S. PATENT DOCUMENTS

| | | | |
|---|---|---|---|
| 1,780,322 | 7/1928 | Tsuji | 43/8 |
| 2,669,798 | 2/1953 | Hesch | 43/12 |
| 3,058,247 | 10/1962 | Puretic | 43/6.5 |
| 3,091,879 | 4/1961 | Puretic | 43/6.5 |
| 3,455,848 | 7/1969 | Knutsen | 43/6.5 |
| 3,548,531 | 4/1969 | Holden | 43/11 |

Primary Examiner—Nicholas P. Godici
Assistant Examiner—Michael William Starkweather
Attorney, Agent, or Firm—Christensen, O'Connor, Johnson & Kindness

[57] ABSTRACT

A mechanically driven brailer for fish from the bunt of a net includes a handle, a brailer hoop, and brail net attached to the hoop. The brailer hoop is hinged to the handle such that it maintains a coplanar relationship with the handle as both are driven downward into the fish. Release of a latch means allows the hoop to change positions relative to the handle so that the volume of the bunt swept by the hoop is maximized.

18 Claims, 12 Drawing Sheets

PROGRAM

1. HYDRAULIC MOTOR ENERGIZED DRIVES HOOP AND HANDLE DOWN THROUGH FISH WITH HOOP AND HANDLE COPLANAR.

2. HOIST WINCH MOTOR ENERGIZED TO DRAW BRAILER HOOP THROUGH FISH IN COORDINATED MOTION WITH DOWNWARD THRUST FROM HYDRAULIC MOTOR (BEGIN LINEAR TRAVERSE).

3. HYDRAULIC MOTOR DEENERGIZED TO END LINEAR TRAVERSE.

4. LATCH MECHANISM RELEASED.

5. CONTINUE ENERGIZING HOISTING WINCH MOTOR TO LIFT BRAILER HOOP.

6. DEENERGIZE HOISTING WINCH MOTOR TO LIMIT HOISTING HEIGHT.

7. ENERGIZE SWING WINCH MOTOR

8. DEENERGIZE SWING WINCH MOTOR AT BRAILER DISCHARGE.

9. REENERGIZE SWING WINCH MOTOR, HYDRAULIC MOTOR, AND HOIST WINCH MOTOR IN REVERSE TO RETURN BRAILER TO POINT OF BEGINNING.

10. REENGAGE LATCH MECHANISM

11. RELEASE SWING WINCH LINE TENSION

12. REENERGIZE HYDRAULIC MOTOR TO BEGIN CYCLE.

Fig. 11.

METHOD AND APPARATUS FOR GATHERING FISH FROM THE BUNT OF A NET

BACKGROUND OF THE INVENTION

The present invention relates to removal of fish from nets in which they are caught, and, more particularly, to an improved method and apparatus for brailing fish from the bunt of a seine.

Figure 1:
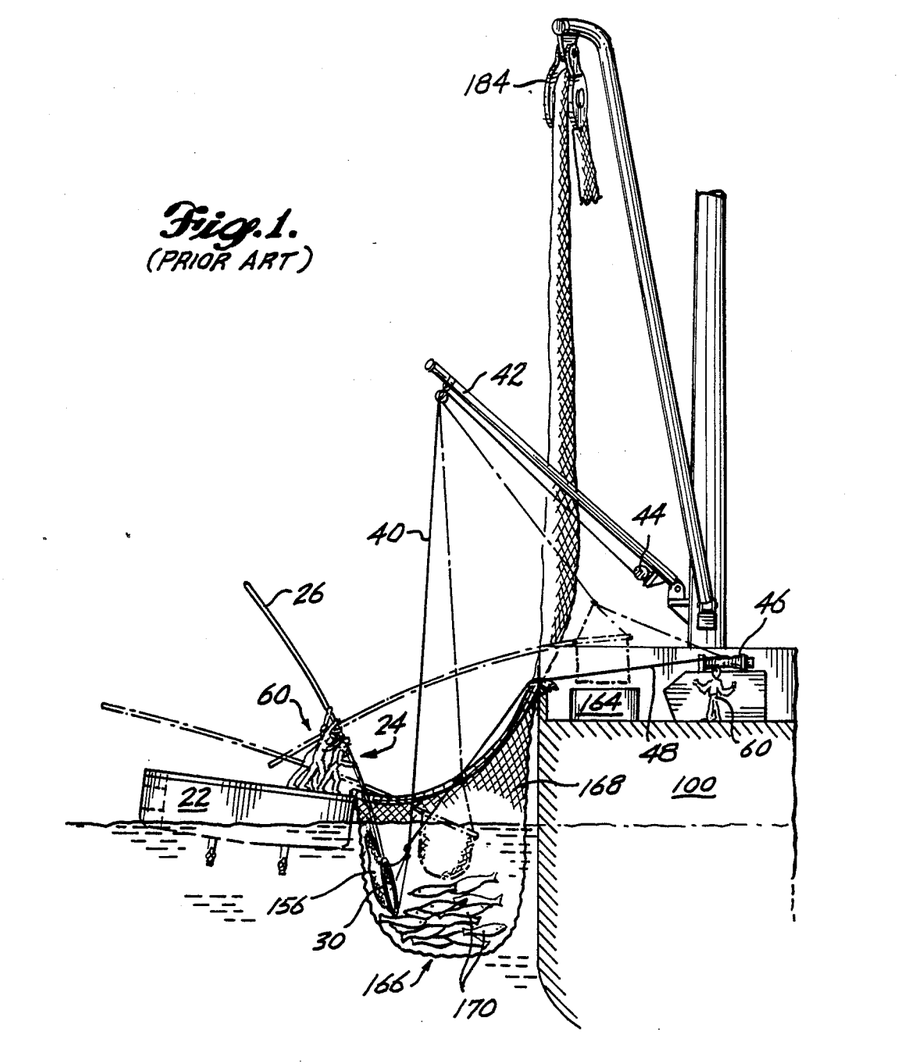
FIG. 1 is a fore and aft view of a typical brailer used in the ocean fishing industry.

Purse seiners are conventionally used to fish for tuna and other ocean-going species that tend to school in specific locations in the ocean. The purse seiner, many times a ship on the order of 250 feet, lays out its net in a circle surrounding the school of fish. As shown in FIG. 1, the free end of the net, commonly known as the corkline, is normally supported by a skiff 22, sometimes on the order of 30 to 40 feet long and having a beam on the order of 20 feet. Once the seiner surrounds the school of fish with its purse seine 168, the purse line is drawn closed at the bottom and the bottom of the net hauled back on board the seiner. The enclosed volume of water within the net becomes progressively smaller as the net is hauled aboard by means of a power block 184 until only a small portion of the seine 168, called the bunt or sack 166, remains in the water adjacent to the large fishing vessel 100. The bunt 166 holds all of the fish 170 captured by the seining operation. It is of utmost importance to remove the fish 170 and place them in the freezing holds of the fishing vessel 100 as soon as possible to prevent deterioration of the fish quality.

Conventionally, the fish are removed from the bunt 166 with a brailer 24, which comprises a hoop 30 from which a brail net 156 is hung. The bottom of the brail net 156 carries a releasable drawstring in the form of a chain with a line attached. When the chain is taut, a scoop is formed that can be employed to transfer fish 170. When the drawstring is released, the bottom of the brail net 156 opens up to release the fish 170 into the vessel's hold via a hopper 164 located on the lower deck. A long handle 26 is usually attached to the conventional brailer 24. In operation, the skiff 22 employed in the brailing operation is pulled alongside the outboard side of the bunt 166. The skiff 22 has a side thruster which is employed to hold the bunt 166 open and away from the side of the fishing vessel 100. Fishermen 60 on the skiff 22 manually thrust the brailer hoop 30 via the handle 26 downwardly into the side of the bunt 166 adjacent the skiff 22. A winch line 40 is attached to the hoop 30 of the brailer 24. The winch line 40 is coupled to a power winch 44 affixed to a boom 42 attached to the mast of the fishing vessel 100. Once the brailer 24 has been manually thrust toward the bottom of the bunt 166, the power winch 44 is energized drawing the hoop 30 upwardly through the fish 170 in the bunt. The power winch 44 hoist the hoop 30 above the rail of the vessel and a purse winch 46 retracts a swing line 48 and pulls the hoop with its load of fish over the hopper 164 from which the fish can be distributed to the vessel's hold.

The manual brailing method just described has been employed by fishermen for many years. The method, however, has its drawbacks. First, because of the steep angle at which the hoop is drawn through the bunt, it is unusual for a full load of fish to be brought into the brailer making the brailing operation rather inefficient. Secondly, fishing of the type just described is normally conducted in the open ocean where swells and wave action can cause the skiff to roll and pitch violently relative to the larger fishing vessel. The ocean-induced movement of the skiff makes it difficult for the fishermen on the skiff to properly thrust the brailer into the bunt. Moreover, working on the skiff is tedious, if not perilous, work as the swinging brailer handle presents a danger to the crew.

SUMMARY OF THE INVENTION

The present invention provides a mechanically driven brailer that eliminates the need for a skiff and fishermen on the skiff to manually thrust the brailer into the bunt of the seine. The device of the present invention, which is preferably power driven, further provides for a much greater sweep of the brailer hoop through the bunt, greatly increasing the opportunity to fill the brailer with each sweep. As a consequence, the number of required sweeps is reduced allowing the bunt to be emptied at a much greater rate than is achievable with the prior manual brailing methods, also, the danger to the crew working in the skiff is eliminated.

The apparatus of the present invention, therefore, provides a power brailing apparatus for removing fish from the bunt of a net located alongside a fishing vessel. The apparatus includes a brailer handle, a brailer hoop, and a net attached thereto, and means for hingedly connecting the hoop to the handle. A bracket means receives and holds the brailer handle. The brailer handle is mounted for reciprocating movement along its longitudinal axis in the bracket means. Preferably, a drive means is associated with the bracket means and selectively drives the brailer handle in at least a downward direction relative to the bracket means. A mounting means mounts the bracket means to the vessel adjacent the bunt for allowing the brailer handle to swing about horizontal and vertical axes relative to the vessel. The apparatus is employed with a hoop hoisting means associated with the vessel for pulling the brailer hoop through the fish in the bunt and thereafter on board the vessel.

In operation, the hoist means is slackened allowing the brailer hoop to depend from the bracket means. Thereafter, the power means is energized to drive the hoop downwardly into the bunt of the net. When the hoop is positioned adjacent the bottom of the bunt, the hoist means is energized to begin drawing the hoop through the fish in the bunt. At the same time, the power means is employed to drive the hoop further away from the bracket means, thus combined action of the hoist means and the power means causes the hoop to traverse the bottom of the bunt in a direction substantially parallel to the longitudinal axis of the vessel. As the hoop reaches the opposite side of the bunt, the power means is deenergized and the hoist means hoists the hoop upwardly through and out of the bunt. The hinge means between the brailer handle and the brailer hoop allows the hoisting means to orient the brailer hoop perpendicular to the direction of hoisting, thus resulting in a swept volume through the bunt by the hoop of several times that achievable with a manual brailing apparatus. Thereafter, the hoop is brought on board, the load of fish released from the brailer, and the operation is repeated.

It is well known that the value of the fish is much greater if they are brought aboard while still alive. The larger size of the powered brailer and the speed with which this power driven brailer can pass through the net greatly enhances the opportunity to catch swimming fish loosely contained in the bunt thus greatly increasing the value of the catch when properly handled onboard the seiner.

BRIEF DESCRIPTION OF THE DRAWINGS

A better understanding of the present invention can be derived by reading the ensuing specification in conjunction with the accompanying drawings wherein.

DETAILED DESCRIPTION OF THE INVENTION

Figure 2:
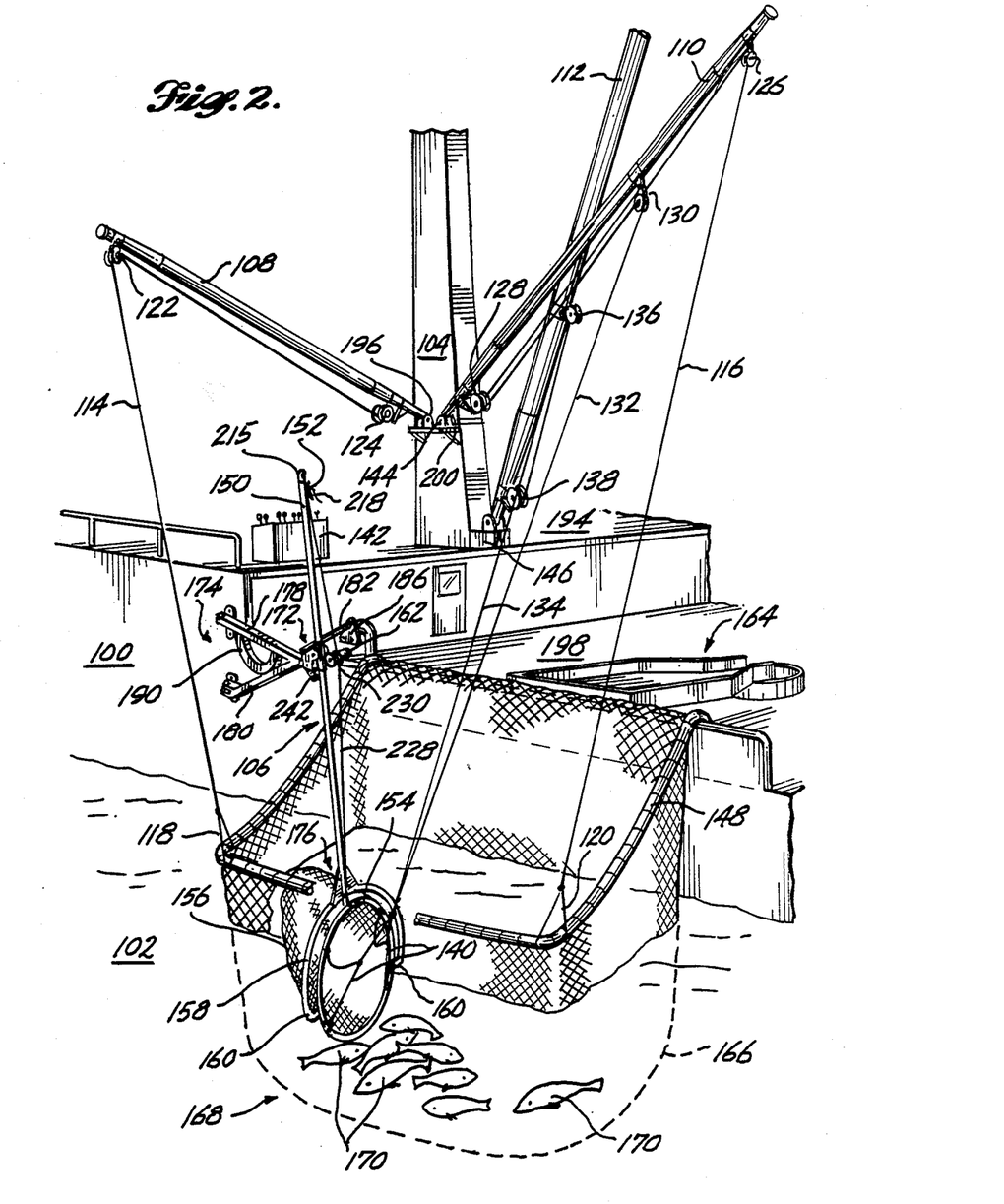
FIG. 2 is an isometric view of an apparatus formed in accordance with the present invention for removing fish from the bunt of a net on the port side of a vessel.

Referring to FIG. 2, the apparatus 106 formed in accordance with the present invention, herein referred to as a brailer, for removing fish 170 from the bunt 166 of a net 168 is useful in conjunction with a fishing vessel 100 having the bunt 166 positioned along the port side of the vessel 100 in FIG. 2. Such fishing vessels are commonly known as purse seiners.

Figure 3:
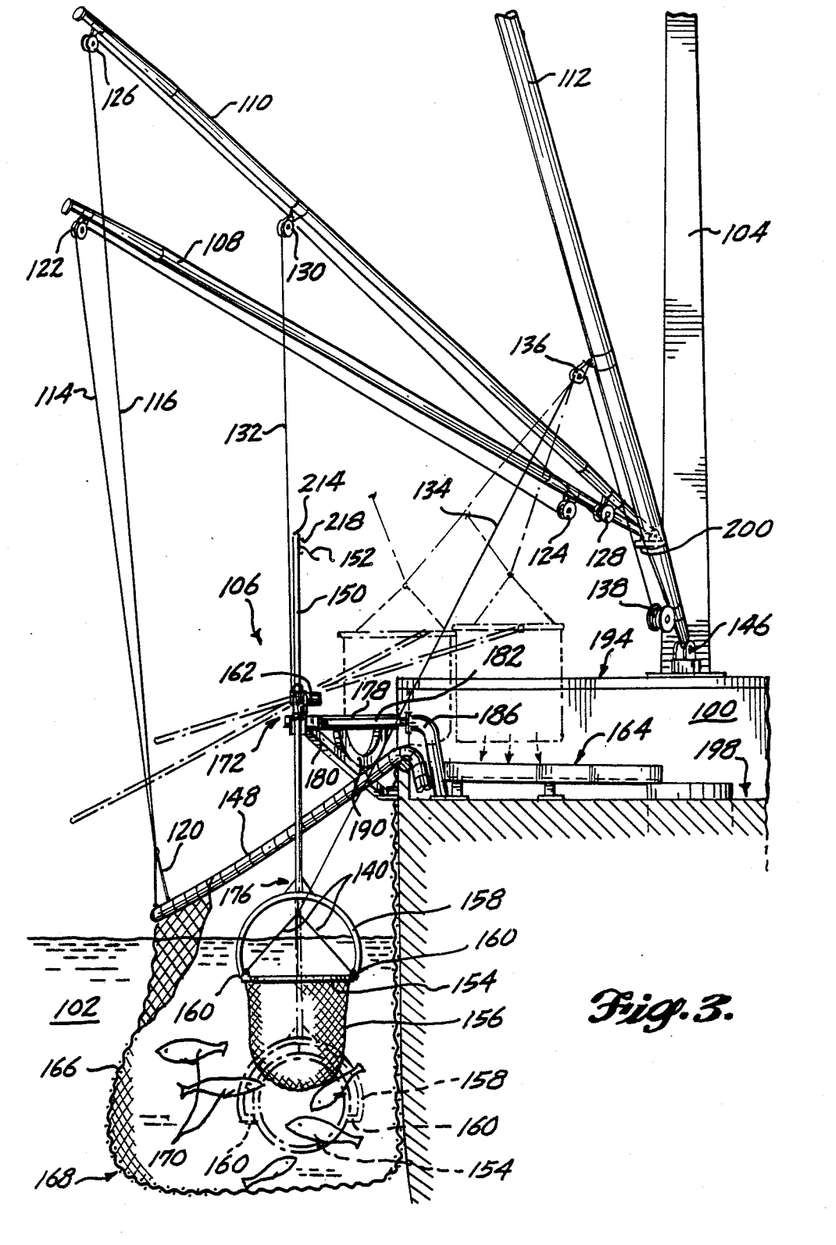
FIG. 3 is an elevational view of the rear of the apparatus in FIG. 2.
Figure 4:
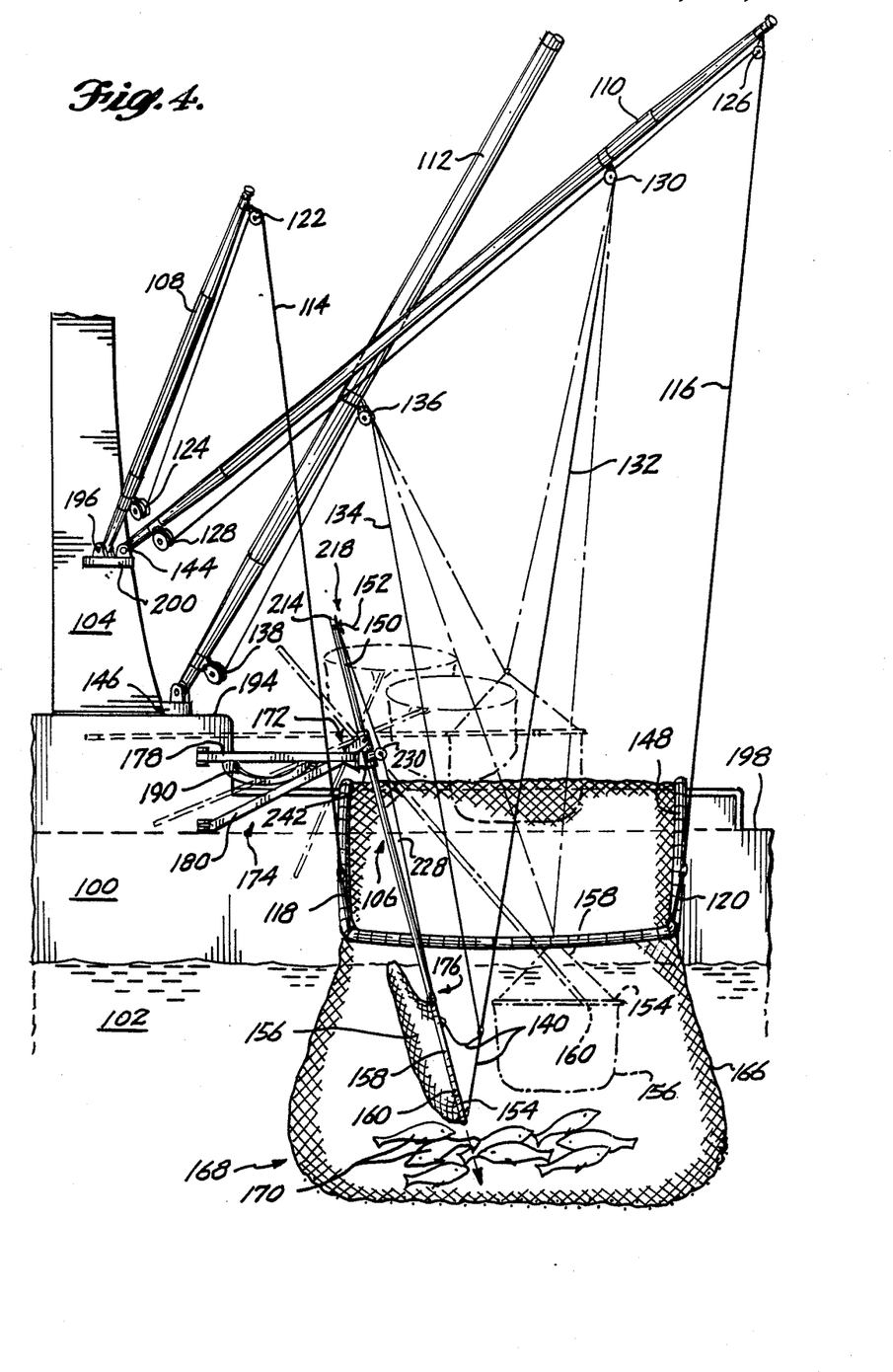
FIG. 4 is an elevational view of the side of the apparatus in FIG. 2.
Figure 5:
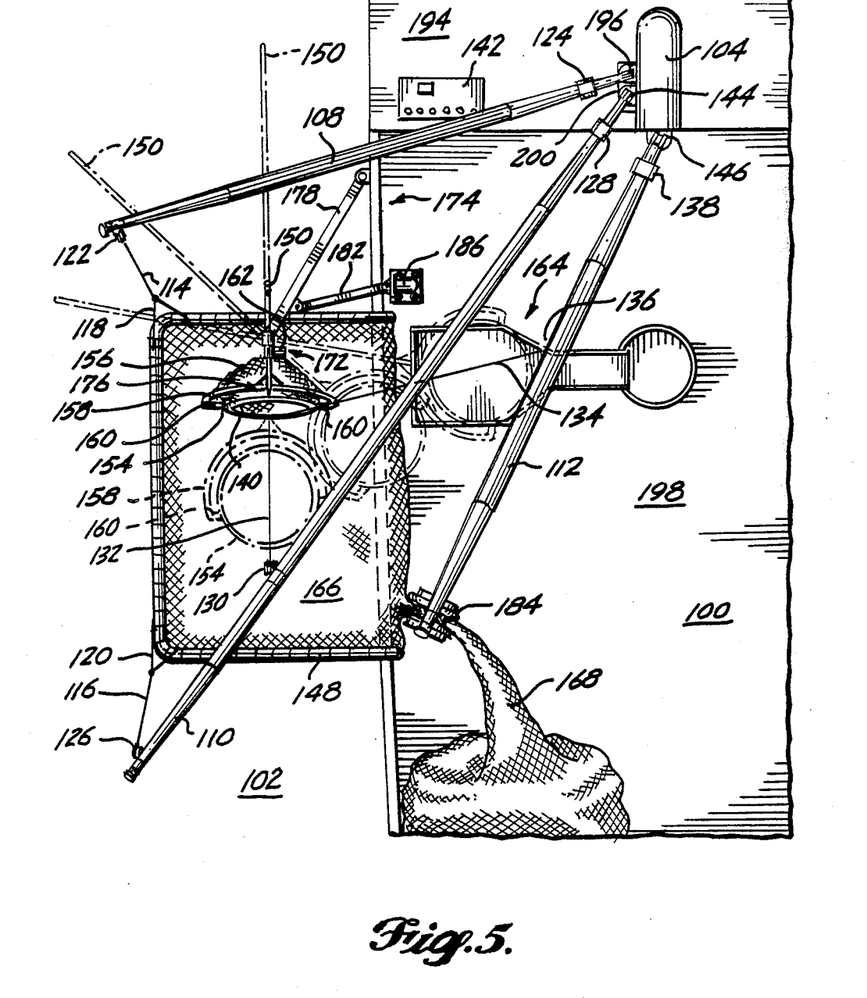
FIG. 5 is a plan view of the top of the apparatus in FIG. 2.

Referring additionally to FIGS. 3, 4, and 5, a typical purse seiner 100 includes a vertically oriented main mast 104 that is fixedly attached to the upper deck 194 of the purse seiner. Depending on the particular size of the purse seiner 100, the main mast 104 may be up to about 60 feet high. Attached at different heights proximate the base of the main mast 104 are the lower ends of three independent longitudinal booms that extend upwardly and outwardly in different directions from the main mast 104. Boom 112, commonly known as the main boom, is a longitudinal member having a length of about 70 feet that extends substantially rearward of the main mast 104. The lower end of the main boom 112 is hingedly attached to the aft side of the main mast 104 by a coupling 146, such as a bracket and pin combination commonly referred to as a gooseneck. The coupling 146 and a series of power-driven cables and pulleys (not shown) enables the main boom 112 to be pivoted vertically and horizontally around the coupling 146. The upper end of the main boom 112 includes a power block (184 in FIG. 5) and a handling system for hauling the purse seine net 168 over the rail on board the fishing vessel 100. On the underside of the main boom 112 near the base of the boom is attached a power-driven swing winch 138 that operates to selectively release or retract lengths of a swing line 134 over a swing pulley 136 that is also mounted on the underside of the main boom 112 above the swing winch 138. Selective retraction of the swing line 34 by the swing winch 138 over the swing pulley 136 causes the brailing apparatus 106 to swing over the hopper 164 on board the vessel 100 as described in more detail hereinbelow. Release of the swing line allows the brailing apparatus 106 to swing back out over the bunt 166.

Attached to the port side of main mast 104, above the coupling 146, are a pair of couplings 144 and 196 mounted atop an outwardly extending platform 200. The couplings 144 and 196, respectively, serve to pivotally attach a longitudinal hoist boom 110 and a longitudinal bunt boom 108 to the main mast 104. Both booms 110 and 108 can be pivoted vertically and horizontally via a series of power-driven topping and vanging cables and pulleys (not shown). The hoist boom 110 extends outward slightly more than the main boom 112. Near the base, on the underside of the hoist boom 110, are attached a pair of powered winches generally indicated by reference numeral 128. One winch 128 selectively releases and retracts a hoist line 132 over a hoist pulley 130 that is attached to the underside of the hoist boom 110 above the winches. As illustrated in FIGS. 3 and 5, the hoist pulley 130 positions the hoist line 132 in substantially the same vertical plane through which the brailer hoop 154 and brail net 156 swing, the vertical plane being preferably parallel to the longitudinal axis of the vessel 100. The retraction of the hoist line 132 causes the brailer hoop 154 and brail net 156 to be elevated so they can be swung on board the vessel by the swing winch and cable, as described in more detail below. The other winch 128 selectively releases and retracts a bunt support cable 116 over a bunt pulley 126 that is attached to the underside of the hoist boom 110 above the hoist pulley 130. As illustrated in FIGS. 3 and 5, the bunt pulley 126 positions the bunt support cable 116 above the aft outward corner of a corkline 148 that forms the upper and outer boundary of the opening in the bunt 166. Release or retraction of the bunt support cable 116 lowers or elevates the corkline 148. The end of the bunt support cable 116 opposite the winches 128 is attached by a bridle 120 to the aft outward corner of the corkline 148. When fish are in the bunt 166, tension on the bunt support cable 116 serves to maintain the corkline 148 above the water level to prevent the escape of the fish 170 from the bunt and to hold the corkline away from the side of the vessel to allow an opening for brailing.

The bunt boom 108 extends outward and forward slightly more than the hoist boom 110. A powered bunt winch 124 is attached to the underside of the bunt boom 108 near its lower end. The bunt winch 124 selectively releases and retracts another bunt support cable 114 over a bunt pulley 122 that is also attached to the underside of the bunt boom 108 near its upper end. The bunt pulley 122 positions the bunt support cable 114 above the fore outward corner of the corkline 148. The end of the bunt support cable 114 opposite the bunt winch 124 is attached to the fore outward corner of the corkline 148 by a bridle 118 to distribute the strain on the corkline 148. Like the bunt support cable 116, the tension on the bunt support cable 114 maintains the corkline 148 above the water line to prevent the escape of fish 170 from the bunt 166. The bunt support cables 116 and 114 also hold the corkline away from the side of the vessel, thereby forming a horizontal opening through which to conduct the brailing operation. Alternatively, if the main boom 112 is positioned out board from the side of the vessel 100, the corkline 148 can be suspended directly from the power block 184 and the hoist boom 110.

It should be understood that the fish in bunt 166 are concentrated in a conventional manner using the tackle on the main boom 112, including the power block 184, and winches aboard the vessel. Also, as described above, the tackle on the bunt and hoist booms cooperate to hold the bunt 166 open so that the brailer 106, formed in accordance with the present invention, can remove fish from the bunt and place them in the hopper 164 on board the vessel 100.

Still referring to FIGS. 2-5, the apparatus 106, formed in accordance with the present invention, for removing fish from the bunt 166 of a purse seine net 168 includes a brailer handle 150 and a brailer hoop 154 and brail net 156 attached to the brailer hoop, a yoke 158 on the end of the handle 150 for hingedly connecting the hoop 154 to the handle 150, as described in more detail hereinbelow. A bracket 172 receives and holds the brailer handle 150 for reciprocating movement along its longitudinal axis within the bracket. Preferably, a hydraulic motor 162 is associated with the bracket 172 for selectively driving the brailer handle 150 in at least a downward direction relative to the bracket 172. A mounting support 174 mounts the bracket 172 to the vessel 100 preferably over the forward end of the bunt 166 and allows the brailer handle 150 to swing about a horizontal and vertical axis relative to the vessel 110. Preferably, the brailer hoop 154 and the brail net 156 are restricted from swinging forward past vertical when the hoop and net are swung through a vertical plane parallel to the longitudinal axis of the vessel 100.

Figure 7:
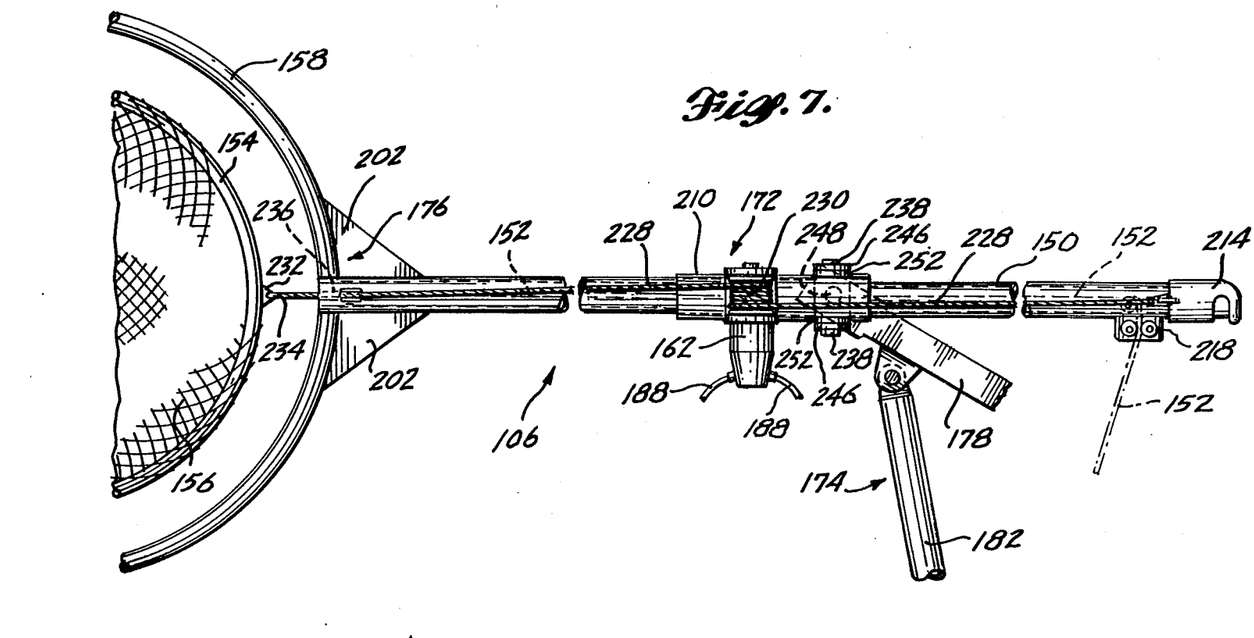
FIG. 7 is a plan view of the top of a portion of the apparatus in FIG. 2.
Figures 8, 9:
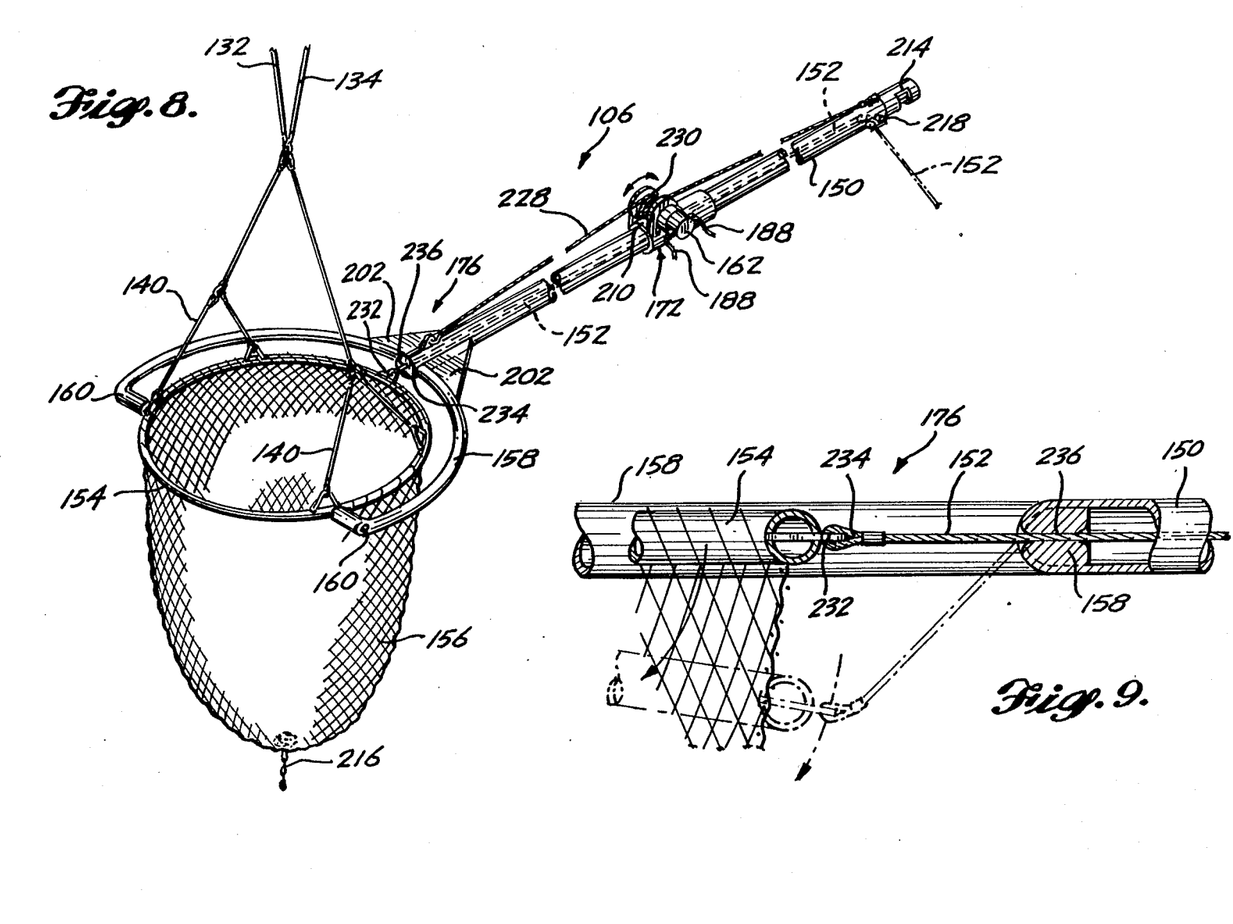
FIG. 8 is an isometric view of a portion of the apparatus in FIG. 2.
FIG. 9 is an elevational view of the side of a latch mechanism useful in the context of the present invention.
Figure 10:
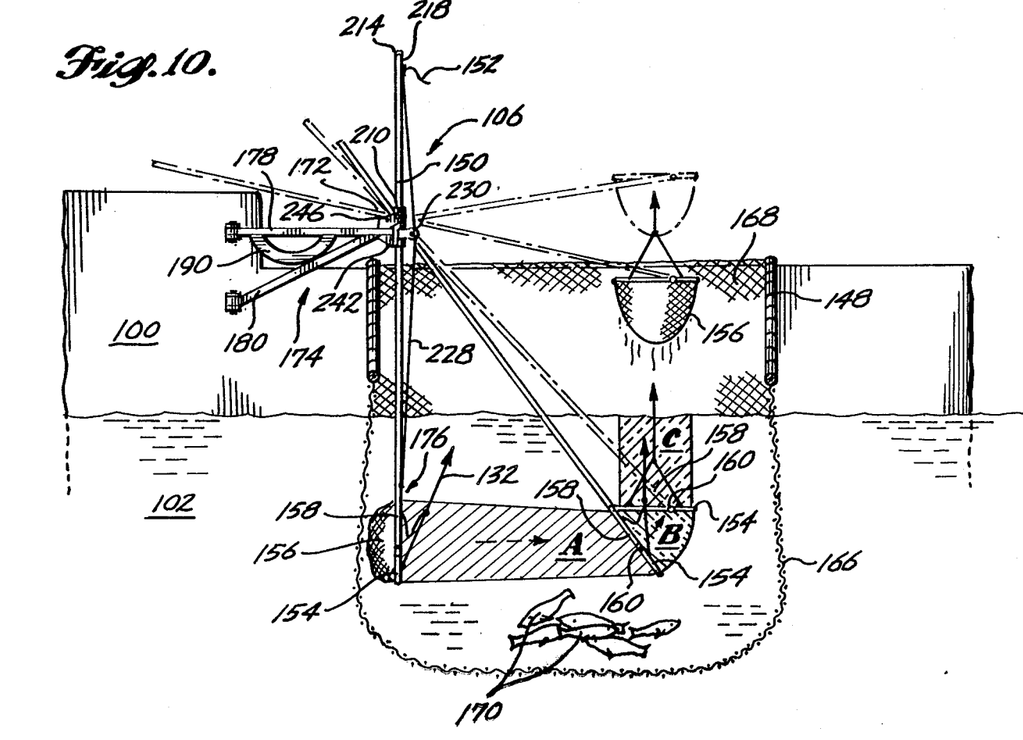
FIG. 10 is a schematic representation of the brailing cycle in accordance with the present invention.
Figure 11:
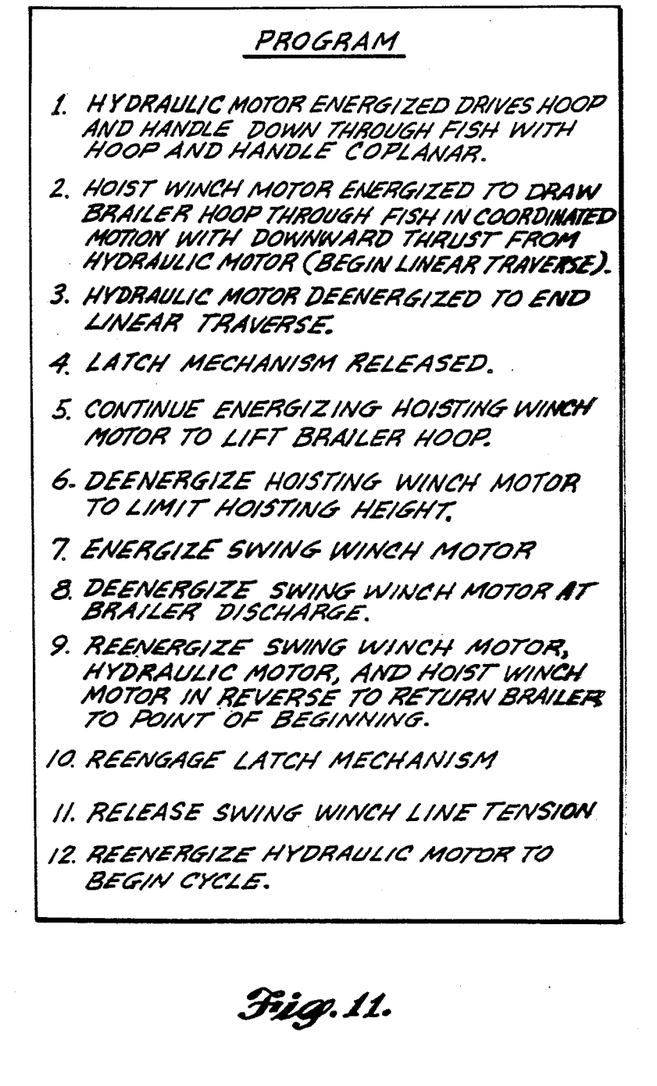
FIG. 11 is a programmable sequence for operating an apparatus formed in accordance with the present invention.

Referring to FIGS. 7 and 8, the longitudinal brailer handle 150 includes a fore and aft end. Although illustrated as having a round cross section, the handle can have other cross-sectional shapes, for instance, a square cross section. The opposite ends of a drive cable 228 are attached to the handle 150 proximate the fore and aft ends of the handle. The drive cable 228 has a length longer than the length of the handle. The drive cable 228 and hydraulic motor 162 cooperate to selectively drive the brailer in at least a downward direction as described in more detail below. Alternatively, although not shown, intermediate the fore and aft ends of the handle 150 is a longitudinal track including a plurality of upwardly projecting registered teeth. As described in more detail hereinbelow, the teeth in the track cooperate with the teeth on a hydraulically driven pinion (not shown) associated with the hydraulic motor 162 to selectively drive the brailer 106 in at least a downward direction.

The fore end of the brailer handle 150 includes a keeper 214 that is used to secure the fore end of the handle to the side of the vessel when the brailer 106 is stowed away. Attached to the aft end of the handle 150 is a semicircular open yoke 158 for hingedly attaching the brailer hoop 154 to the brailer handle 150. The yoke 158 can be attached to the aft end of the brailer handle by conventional means, such as welding or bolting. Preferably, flanges 202 are provided on the left and right sides of the handle where the yoke is attached thereto.

Referring in more detail to FIG. 8, the open end of the yoke 158 includes two pivots 160 that are hingedly attached to the perimeter of the hoop 154 at points that are preferably outward of the transverse axis of the hoop that is perpendicular to the longitudinal axis of the handle 150. The pivots 160 can be provided by axial pins, or other conventional means for hingedly attaching the hoop 154 to the ends of the yoke 158 for swinging about the axis passing through both pivots 160. The pivots 160 support the hoop 154 away from the yoke 158 a distance sufficient to allow the fish in the bunt to pass between the yoke and the hoop without being damaged. When the hoop 154 is in a position coplanar with the yoke 158, the yoke preferably extends around more than one-half of the perimeter of the hoop 154. The hoop 154 is attached to both the hoist line 132 and the swing line 134 by a bridle 40 in the shape of two inverted Y's connected at the upper end. The two legs of each Y straddle the point where the transverse axis of the hoop 154 intersects the perimeter of the hoop 154. Preferably, relative to each other, the two legs of each inverted Y are equidistant from the intersection point. By positioning the legs of each Y equidistant from the intersection point, when the hoop 154 is elevated by retracting the hoist line 132, the tension on the hoist line 132 is distributed equally to the perimeter of the hoop. The equal distribution of the tension stabilizes the hoop 154 perpendicular to the hoisting direction, allowing the hoop 154 to pass through and scoop up the maximum amount of fish. Attached to the hoop 154 is a conventional brail net 156 that includes a purse line 216 that controls the opening and closing of the bottom of the brail net 156. During the lowering and extending of the brailer handle 150 into the fish, the brailer 106 is held in a position coplanar with the handle 150 by a releasable latch mechanism 176, preferably a cleated line 152 with one end 234 connected to the perimeter of the brailer hoop 154. Although the brailer hoop and yoke are shown in the Figures as being circular, it should be understood that other shapes are equally applicable, for example, squared ovals or ellipsoidal shaped hoops and yokes.

Referring to FIG. 9, an exemplary latch mechanism 176 is encased within the aft end of the brailer handle 150. The latch mechanism 176 includes a latch line 152 having one end 234 threaded through eyelet 232 that is attached to the perimeter of the hoop 154 near the point where the longitudinal axis of the handle 150 initially intersects the perimeter of the hoop. The end 234 after being threaded through the eyelet 232 is fastened to the latch line 152 by clamping or bolting in order to securely attach the latch line to the eyelet. The latch line 152 passes through a bore 236 that extends along the longitudinal axis of the handle 150 in the perimeter of the yoke 158. The balance of the latch line 152 passes through the interior of the handle 150 to the fore end of the handle where the line passes out the handle 150. The aft end of the bore 236 that passes through the yoke includes inwardly recessed edges to reduce the wear on the latch line 152 as it slides within the bore 236. In a taut position, the latch line 152 holds the hoop 154 and handle 150 in a coplanar relationship, preventing the swinging movement of the hoop 154 about pivots 160. Thus, when the brailer 106 is driven downward into the bunt 166, the latch line 152 is normally taut keeping the hoop 154 and handle 150 in a coplanar relationship. When tension on the latch line 152 is released, the hoop 154 is free to pivot out of the coplanar relationship with the handle 150. A cleat 218 is provided proximate the fore end of the handle 150 to anchor and maintain tension on the latch line 152 when it is retracted to maintain the hoop 154 in a coplanar relationship with the handle 150. An alternative for maintaining the tension on the latch line 152 includes anchoring the fore end of the latch line 152 to the fore end of the brailer handle 150 and providing a spring having a predetermined tension between the anchored fore and aft ends of the latch line. As the brail net is filled, the tension on the latch line increases until it is great enough to stretch the spring. Preferably the extension of the spring will coincide with the tension on the latch line when the brailer hoop is about ready to end its linear traverse of the bunt. It should be understood that additional designs of restraining and release mechanisms will be equally applicable to a brailer 106 formed in accordance with the present invention, so long as the mechanisms releasably engage and disengage the hoop 154 in a position coplanar with the brailer handle 150.

Figures 12, 12A:
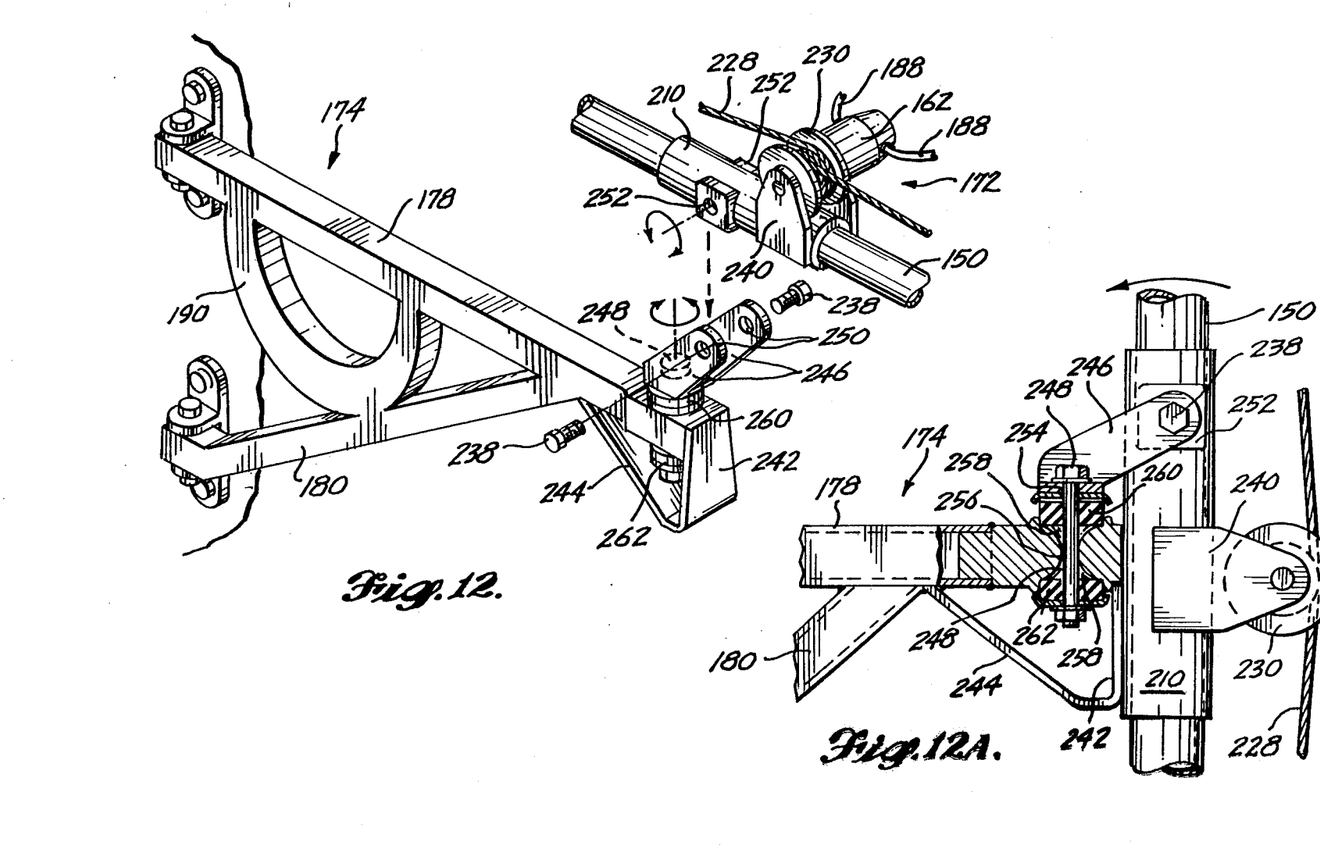
FIG. 12 is a partially exploded isometric view of a bracket for slidably receiving a brailer handle and a mounting support formed in accordance with the present invention.
FIG. 12A is a cutaway view of the side of the bracket and mounting support in FIG. 12.

Referring to FIGS. 7, 12, and 12A, mounting support 174 includes a clevis 246 for receiving a tubular collar or sleeve 210 of bracket 172 that receives and holds the brailer handle 150 for reciprocating movement along its longitudinal axis. The bracket 172 is attached to the outward end of the upper support arm 178 of the mounting support 174 by the clevis 246 such that the bracket 172, including the brailer handle 150 can swing about a horizontal and a vertical axis relative to the vessel 100. As discussed above, preferably the bracket 172 is attached to the mounting support 174 such that the brailer hoop 154 and the brail net 156 will not swing forward past vertical in the fore and aft plane.

The clevis 246 includes a U-shaped coupling that has a pair of upward and outward extending arms forming an open end. The U-shaped coupling has a vertical bore 254 passing through the base of the "U". A horizontal bore 250 passes through the outward ends of the parallel arms of the U-shaped coupling in a direction perpendicular to the vertical bore 254. The clevis 246 is attached to the outward end of the upper support arm 178 just outward from the point where the lower support arm 180 engages the underside of the upper support arm. A bolt 248 is passed through the bore 254 and a vertically oriented aperture 256 in the outward end of the upper support arm 178 to attach the clevis to the upper support arm. The upper and lower ends of aperture 256 include oversized cavities 258 capable of receiving rubber bumpers 260 and 262. The rubber bumpers 260 and 262 are doughnut-shaped elastic members that impart a degree of flexibility in the attachment of the clevis 246 to the upper support arm 178. The upper bumper 260 sits in the upper cavity and spaces the clevis 246 above the upper surface of the support arm 178. The lower bumper 262 is held in the lower cavity 258 and spaces the nut on the end of bolt 248 away from the underside of the upper support arm 178. Because the aperture 256 has a diameter slightly larger than the diameter of bolt 248 and the cavities 260 are even larger in diameter than the aperture, the bolt 248 can rotate about a vertical axis and move out of a vertical orientation as the rubber bumpers 260 and 262 bias the bolt into the vertical orientation.

The bore 250 passing horizontally through the outward extending arms of the clevis 246 receives and retains a pair of trunnions 238 that extend through the parallel arms of the clevis 246 via the bore 250 from opposing sides of the clevis. The threaded ends of the trunnions 238 are received in threaded members 252 attached to the sides of the sleeve 210. The cooperation of the bore 250, trunnions 238, and threaded members 252 allows the sleeve 210 and handle 150 to swing through a plane perpendicular to the axis passing through the bore 250. The handle 150 in cooperation with the clevis 246 can also swing through a plane perpendicular to the axis defined by the bolt 248. The forward swinging of the hoop 154 and brail net 156 in the fore and aft plane is limited by a stop plate 242 that is rigidly fixed to the underside of the upper support arm 178 just outward of the lower support arm 180.

Associated with the sleeve 210 is a base 240 for elevating a reel 230 and a hydraulic motor 162 above the sleeve 210. The hydraulic motor supplied by hydraulic lines 188 drives the reel 230 that has the drive cable 228 wound a plurality of times, preferably 4 or 5 times, around the reel 230. As described above, the ends of the drive cable 228 are attached to the handle 150 near the fore and aft ends of the handle 150. The axis of the reel 230 is perpendicular to the longitudinal axis of the handle 150. In FIG. 7, driving the reel in a fore direction causes the reel to retract a portion of the drive cable 228 aft of the reel 230 while simultaneously releasing an equal portion of the drive cable 228 forward of the reel. This cooperative action causes the handle 150 to be elevated when the brailer 106 is in a vertical position. In a similar manner, driving the reel 230 in a rearward direction causes a portion of the drive cable 228 forward of the reel to be retracted while an equal portion of the drive cable aft of the reel is released. This action causes the brailer 106 to be driven in a downward direction when the brailer is in a vertical position. An alternative embodiment (not shown) for the drive mechanism described above includes a reel that has two halves, and a drive cable that consists of two separate lengths of cable. The ends of one cable are attached to the handle proximate the fore end and to one half of the reel. The ends of the other cable are attached to the handle proximate its aft end and to the other half of the reel. Each cable is wound around the respective half of the reel in opposing directions when the hydraulic motor is energized so that the brailer is driven in a downward or upward direction depending on the relative winding directions. Alternatively, the hydraulic motor 162 includes a pinion (not shown); the motor 162 being associated with the bracket 172 such that the pinion can engage the teeth of a longitudinal track (not shown) mounted on the handle 150. If the bracket 172 is in the form of a sleeve 210 through which the handle 150 slides, the upper surface of the sleeve should include an opening through which the pinion can engage the track. When the rack and pinion are used, the hydraulic motor 162 can be energized forward to thrust the brailer 106 downward into the bunt 166. Energizing the hydraulic motor 162 in reverse, retracts the brailer 106 from the discharging position over the hopper 164 and holds the brailer in position above the surface of the water as it swings back into a vertical orientation prior to being thrust into the bunt.

Referring to FIGS. 2-5, 7, and 12, the mounting support 174 also includes an upper horizontal support arm 178 pivoted to the port side of the vessel 100 about a vertical axis. On the same vertical axis, below the upper support arm 178, a lower support arm 180 is also pivoted for swinging motion outward from the vessel 100. The lower support arm 180 angles upwardly from the side of the vessel 100 toward the underside of the upper horizontal support arm 178, and is integrally attached proximate the outer end of the upper support arm 178. An arcuate truss 190 is positioned between the upper support arm 178 and lower support arm 180 in order to provide additional structural support therebetween. The arcuate shape of the truss 190 allows the brail net 156 to be stored between the upper and lower support arms 178 and 180 when the brailer 106 is stored against the side of the vessel 100. The upper support arm 178, lower support arm 180, and arcuate truss 190 can be made from steel beams or any other strong structural material. The swinging movement of the mounting support 174 allows the distal end of the mounting support 174 to swing through an arc of essentially 180° outward from the side of the vessel 100. The swinging motion of the mounting support 174 in the aft direction is limited by a horizontal support arm brace 182 that extends inward from the mounting support and is releasably attached to the lower deck 198 of the vessel 100 by a purse davit 186 that is located rearward of the vertical axis about which the mounting support 174 is pivoted. By attaching the inboard end of the support arm brace 182 to the outboard face of the purse davit 186, the purse davit 186 and support arm brace 182 positions the mounting support 174 away from the vessel 100 and above the bunt 166. The support arm brace 182 also stabilizes the horizontal deflection of the mounting support 174 when force is exerted upon the support 174 during the brailing process. The support arm brace 182 is hinged to the mounting support 174 and releasably attached to the purse davit 186 so that when the mounting support 174 is swung in a forward direction for stowage, the fixed length of the support arm brace 182 does not prevent the forward swinging movement of the mounting support 174. An alternative for the mounting support 174 could be a hydraulically driven articulated arm having at least one linkage. The arm could be rotatably attached to the upper deck of the vessel for swinging through a vertical and a horizontal plane.

Figure 6:
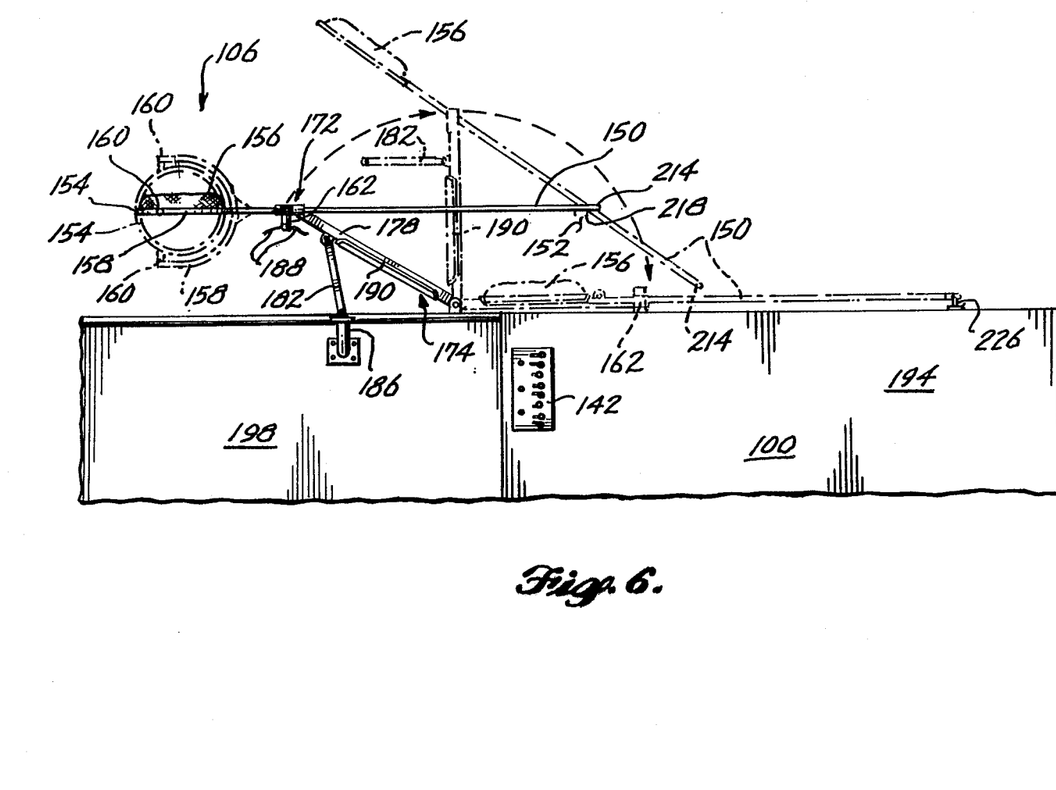
FIG. 6 is a plan view of the top of an apparatus formed in accordance with the present invention being stowed alongside a vessel.

Because the purse seine net 168 can be brought onboard from a position alongside the vessel 100, the net 168 often drags over the side of the vessel 100, thus it is preferred that when not being used, the brailer 106 be securely and smoothly stowed alongside the vessel 100 where it cannot become entangled in the net 168 or interfere with the pursing of the net. Referring to FIG. 6, prior to stowage, the brailer 106 is rotated 90° about its longitudinal axis to place the yoke 158 and hoop 154 in a vertical plane parallel to the longitudinal axis of the vessel. The support arm brace 182 is released from the purse davit 186 by removing the pin from the end of the support arm brace 182 attached to the purse davit. The entire mounting support 174, the bracket 172, and brailer 106, can then freely swing forward to a position for stowage against the side of the vessel 100. Because the bracket 172 and brailer 106 are mounted to the end of the mounting support 174 for swinging about a vertical axis, the brailer 106 can be folded against the side of the vessel 100 forward of the vertical axis about which the mounting support 174 pivots. The keeper 214 on the forward end of the brailer handle 150 is received by pad eye 226 that is attached to the side of the vessel, the pad eye 226 serves to secure the fore end of the brailer handle 150 to the side of the vessel 100 for stowage.

Referring to FIGS. 2, 4, 10, and 11, a brailer 106 formed in accordance with the present invention can be operated in a programmable sequence from a control station 142 on board the vessel 100, after a portion of the purse seine net 168 has been brought on board the vessel 100 and the bunt 166 containing the captured fish 170 formed. After the brailer 106 has been positioned over the bunt 166 with the longitudinal axis of the handle 150 directed downward into the bunt, the hydraulic motor 162 on the bracket 172 is energized and drives the hoop 154 and brail net 156 down through the fish 170 to a position adjacent the bottom of the bunt 166, the latch line 152 is taut and cleated to keep the handle 150 and hoop 154 coplanar. One of the winches 128 is then energized so that the hoist line 132 is retracted. The retraction of the hoist line 132 tends to raise the brailer hoop 154; however, the coordinated downward thrust of the hydraulic motor 162 causes the hoop 154 and brail net 156 to linearly traverse the bottom of the bunt 166. As the hoop 154 and brail net 156 traverses the bottom of the bunt 166, a volume of the bunt, indicated by zone A, is swept through. The volume swept is maximized by maintaining the hoop and brail net in a position relatively perpendicular to the direction of linear traverse. Near or at the end of the linear traverse of the bunt 166 by the hoop 154, the tension on the latch line 152 is released from the cleat 218 as the winch 128 continues to retract the hoist line 132, which causes the hoop 154 to swing out of the coplanar relationship with the handle 150 and pivot within the yoke 158 to a position that is substantially parallel to the surface of the water. As the hoop 154 swings into the position substantially parallel to the surface of the water, a volume of the bunt 166 generally indicated by zone B is swept by the brailer hoop 154 and brail net 156. When the brailer hoop 154 reaches the opposite side of the bunt 166, the hydraulic motor 162 is deenergized to end the linear traverse. The winch 128 continues to retract the hoist line 132, which serves to raise the brailer hoop 154 and brail net 156 upward through the bunt 166. As the brailer hoop 154 and brail net 156 are raised upward through the bunt 166, a volume of the bunt generally represented by zone C is swept. Because the volume of the bunt 166 swept by the hoop and brail net during the brailing cycle is maximized, the efficiency of the brailing operation is increased over conventional brailing means. As the hoop 154 and brail net 156 break the water, the brail net is substantially full of fish, continued retraction of the hoist line raises the hoop 154 and brail net 156 above the lower deck 198 of the vessel 100. Because the handle 150 is horizontally pivoted to the hoop 154 through the yoke 158 and the latch line 152 is released, the hoop 154 can pass above the horizontal plane in which the bracket 172 lies without bending the handle. The winch 128 is then deenergized. In order to swing the brailer hoop 154 and brail net 156 to a position above the hopper 164, the swing winch 138 is energized to retract the swing line 134. When the brailer hoop 154 and brail net 156 are positioned above the hopper 164, the swing winch 138 is deenergized. The fish in the brailer can now be unloaded by releasing the purse line (216 in FIG. 8) on the bottom of the brail net 156. After the brail net 156 is empty, the purse line 216 is secured to close the bottom of the brail net 156 and the swing winch motor 138 and hydraulic motor 162 are reenergized, in reverse, to release the swing line 134 and return the brailer hoop 154 to a position above the fore end of the bunt 166. As the brailer hoop 154 is swung back about the fore end of the bunt 166, the latch line 228 is retracted to position the hoop 154 in a coplanar relationship with the handle 150. The swing winch motor 138 is then deenergized to release the tension in the swing line 134 and the winch 128 is then reenergized, in reverse, to release a portion of the hoist line 132 so that the brailer hoop 154 and handle 150 depend from the mounting support 174 and are angled downward into the opening of the bunt, ready to be driven downward to begin another brailing cycle.

Figures 13, 14, 15:
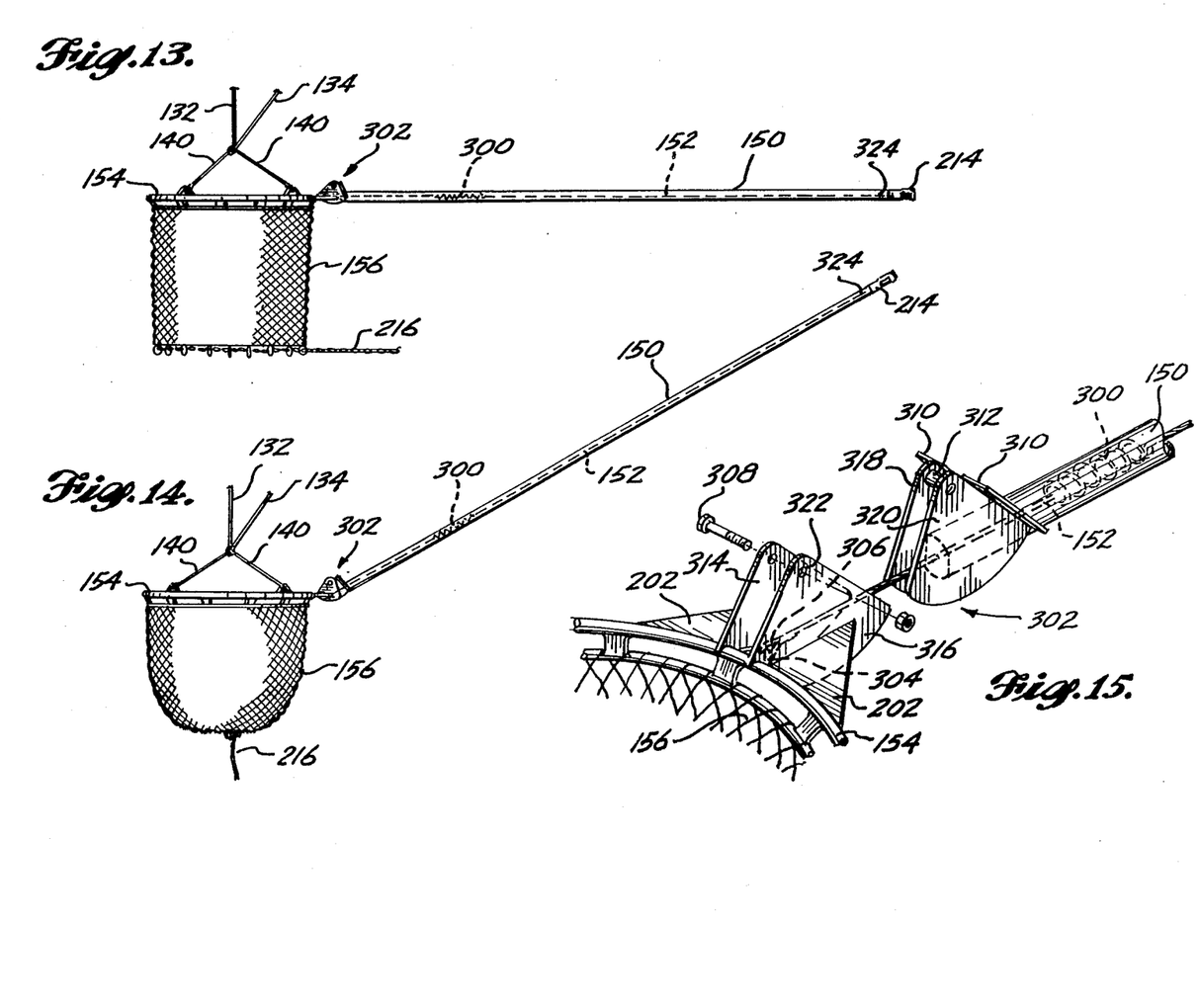
FIG. 13 is an elevational view of the side of a portion of an apparatus formed in accordance with the present invention.
FIG. 14 is an elevational view of the side of the apparatus in FIG. 13.
FIG. 15 is an exploded isometric view of the hinge portion of the apparatus in FIG. 13.

Referring to FIGS. 13 and 14, an alternative embodiment of an apparatus formed in accordance with the present invention includes a brail hoop 154 and brail net 156 that is hingedly attached to the end of the handle 150 by a hinge 302, rather than the previously described yoke 158 that is mounted on the end of the handle 150. The hoop 154 is held in a coplanar relationship to the handle 150 by the tension on the latch line 152 that has one end 306 attached to an eyelet 304 on the perimeter of the brail hoop 154 and the other end 324 fixed to the handle 150 proximate keeper 214. In this alternative embodiment, the tension on the latch line 152 is maintained by a spring 300 between ends 306 and 324 rather than by cleating the line 152 as previously described. When the load of the brail net 156 becomes large enough, the spring 300 will expand, allowing the hoop 154 and brail net 156 to swing out of a coplanar relationship with the handle 150.

Referring additionally to FIG. 15, the hinge 302 includes a pair of vertical stationary flanges 314 and 316 that are attached to the perimeter of the hoop 154. The flanges 314 and 316 are triangular-shaped plates with the corner defining one end of the longest side attached to the perimeter of the hoop 154 so that the plates are in two vertical planes horizontally spaced apart. The upper corner of each flange 314 and 316 includes a horizontal bore 322 for receiving a pivot pin 308. The outer sides of the flanges 314 and 316 are attached to the perimeter of the hoop 154 by horizontal flanges 202 for further support. The flanges 314 and 316 are spaced apart sufficiently to receive a complementary pair of vertically oriented triangular flanges 318 and 320 attached to the aft end of the handle 150. A horizontal sleeve 312 extends between the upper corners of the flanges 318 and 320 and defines a bore for receiving pivot pin 308 when the sleeve 312 and bore 322 are aligned. The relative geometries of the flanges when the pivot pin 308 attaches the flanges 314 and 316 to the flanges 318 and 320 is such that the hoop 154 and handle 150 can swing into and out of a coplanar relationship depending on the tension on the latch line 152. The upper and forwardmost sides of the triangular flanges 318 and 320 include stop plates 310 that extend perpendicularly out from the upper forwardmost edge of the flanges. The stop plates 310 extend from the flanges 318 and 320 sufficiently such that when the hoop 154 and handle 150 return to a coplanar relationship, the stop plates 310 contact the upper and forwardmost sides of the flanges 314 and 316 to stop the hoop from overswinging through the coplanar position.

It is to be understood that modifications and changes to the preferred embodiment of the invention herein described and shown can be made without departing from the spirit and scope of the invention. For example, other types of mechanisms for maintaining the brailer hoop and handle in a coplanar relationship or means of attaching the brailer hoop to the handle will be equally useful in the present invention, so long as they releasably maintain the hoop in a coplanar relationship with the handle while both are being driven downward into the bunt and then allow the hoop to pivot in relation to the handle into a horizontal position substantially parallel with the water surface. One of ordinary skill, after reading the foregoing specification, will be able to effect various changes, substitutions and equivalents, and other alterations without departing from the broad concept disclosed therein. It is therefore intended that the scope of letters patent granted hereon will be limited only by the definition contained in the appended claims and equivalents thereof.

The embodiments of the invention in which an exclusive property or privilege is claimed are defined as follows:

1. An apparatus for removing fish from a bunt of a net located alongside a fishing vessel comprising:
    a brailer handle;
    a brailer hoop and brail net attached to said hoop;
    means for hingedly connecting said hoop to said handle;
    bracket means for receiving and holding said brailer handle, said brailer handle being mounted for reciprocating movement along its longitudinal axis in said bracket means; and
    mounting means for mounting said bracket means to said vessel adjacent said bunt for allowing said brailer handle to swing about horizontal and vertical axes relative to said vessel.

2. The apparatus of claim 1, further comprising:
    drive means associated with said bracket means for selectively driving said brailer handle in at least a downward direction relative to said bracket means.

3. The apparatus of claim 1, further comprising:
    hoop hoisting means associated with said vessel for pulling said brailer hoop through said bunt and on board said vessel.

4. The apparatus of claim 1, wherein said means for hingedly connecting comprises:
    a yoke affixed to and extending away from the outer end of said handle, said yoke at least partially surrounding said hoop, the outer ends of said yoke being hinged to said hoop; and
    latch means for releasably holding said hoop in a position substantially coplanar with said handle.

5. The apparatus of claim 1, further comprising:
    latch means for releasably holding said hoop in a position substantially coplanar with said handle.

6. The apparatus of claim 4, wherein said hoop includes a transverse axis, said outer ends of said yoke hinged to said hoop outward of said transverse axis.

7. The apparatus of claim 1, wherein said bracket means includes a tubular sleeve for receiving and holding said brailer handle.

8. The apparatus of claim 7, wherein said mounting means includes a clevis pivoted about a vertical axis, said clevis also including means for retaining said tubular sleeve for pivotal movement about a horizontal axis.

9. The apparatus of claim 2, wherein said drive means includes at least one drive cable attached to said handle, and a power-driven means for selectively retracting and releasing said drive cable.

10. A method for removing fish from a bunt of a net located alongside a fishing vessel, the method comprising the steps:
   (a) mechanically driving a brailer into said bunt for netting fish, said brailer including a brailer handle, a brailer hoop, and a brail net attached to said hoop, said hoop attached to said handle;
   (b) thereafter causing said brailer hoop and brail net to traverse said bunt in a direction substantially parallel to the longitudinal axis of said vessel; and
   (c) elevating said brailer hoop and net to remove said fish from said bunt.

11. The method of claim 10, wherein step (b) further comprises mechanically driving said brailer hoop and net downward during said traverse.

12. The method of claim 11, wherein said brailer hoop and net traverse the bottom of said bunt.

13. A method for removing fish from a bunt of a net located alongside a fishing vessel, the method comprising the steps:
   (a) positioning within said bunt, a first means for brailing fish, said first means including a brailer handle, a brailer hoop and brail net attached to said hoop, and a means for hingedly connecting said hoop to said handle;
   (b) thereafter causing said brailer hoop and brail net to traverse said bunt, said hoop pivoting out of a position coplanar with said handle near the end of said traverse; and
   (c) elevating said brailer hoop and brail net to remove said fish from said bunt.

14. The method of claim 13, wherein said first means further includes a latch means for releasably holding said hoop in a position substantially coplanar with said handle, step (b) further comprising releasing said latch means near the end of said traverse.

15. The method of claim 13, wherein step (a) further comprises mechanically positioning, within said bunt, said first means for brailing fish.

16. The method of claim 13, wherein said brailer hoop and brail net traverse the bottom of said bunt.

17. The method of claim 13, wherein said brailer hoop and brail net traverse said bunt in a direction parallel to the longitudinal axis of said fishing vessel.

18. The method of claim 13, wherein said hoop pivots out of a position coplanar with said handle and into a substantially horizontal position.

* * * * *